June 24, 1969     P. J. HILLE     3,451,663

HEATING DEVICE FOR AIRCRAFT ENGINES

Filed March 14, 1968

INVENTOR.
PETER J. HILLE
BY Williamson, Palmatier
& Bains
ATTORNEYS

United States Patent Office 3,451,663
Patented June 24, 1969

3,451,663
HEATING DEVICE FOR AIRCRAFT ENGINES
Peter J. Hille, 416 E. 2nd St., Willmar, Minn. 56201
Filed Mar. 14, 1968, Ser. No. 713,225
Int. Cl. F23l 15/00
U.S. Cl. 263—19                                        6 Claims

ABSTRACT OF THE DISCLOSURE

A portable heating device for heating aircraft engines comprising a heater unit including a housing and having a burner mechanism therein connected to a source of fuel. A plenum housing positioned upon the heater unit and having a transverse horizontal partition therein to define the interior of the plenum housing into an upper and lower chamber through which air to be heated passes.

---

A plenum housing having an inlet and an outlet arranged and constructed so that air is moved first through the upper chamber and then through the lower chamber so that a highly efficient heat exchange action takes place and flows from the housing through the action of a blower mechanism which is mounted on the plenum housing. An elongate conduit connected to the blower mechanism and being connectible to an aircraft engine to thereby permit the engine to be readily heated during cold weather to facilitate starting the engine.

Summary of the invention

Quite often when aircraft engines are subjected to extremely cold weather, it is difficult to start the engine unless the engine is first heated. However, even though there are currently available some heating devices for heating aircraft engines, many of these devices are quite large and difficult to handle as well as being expensive. Other of these heating devices, because of their particular construction, present certain hazards during the operation thereof.

The present invention is directed to the provision of the rather compact portable heating device for use in heating aircraft engines. The heating device comprises a relatively small heater unit including a housing having a burner unit therein which is adapted to utilize liquid fuel. The heating device also includes a plenum housing which is detachably mounted upon the heating unit and whose heating chambers are arranged and constructed so that the incoming air is preheated thereby permitting a very efficient heat exchange action to take place. The plenum housing is also arranged and constructed whereby the interior thereof is completely sealed from the burner unit so that the air passing therethrough which is heated, and which is then directed through a conduit by means of a blower mechanism into the aircraft engine carries no volatile materials. The present heater device, because of its compact construction, may be readily carried from one place to another and may be readily operated so that it is ideal for owners of small aircraft.

Detailed description of the invention

Figure 1:
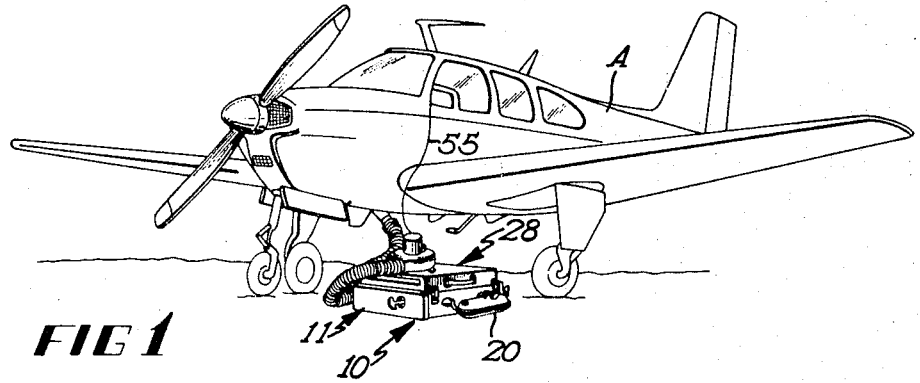
FIG. 1 is a perspective view of the novel heating device as it is being used to heat an aircraft engine.
Figure 2:
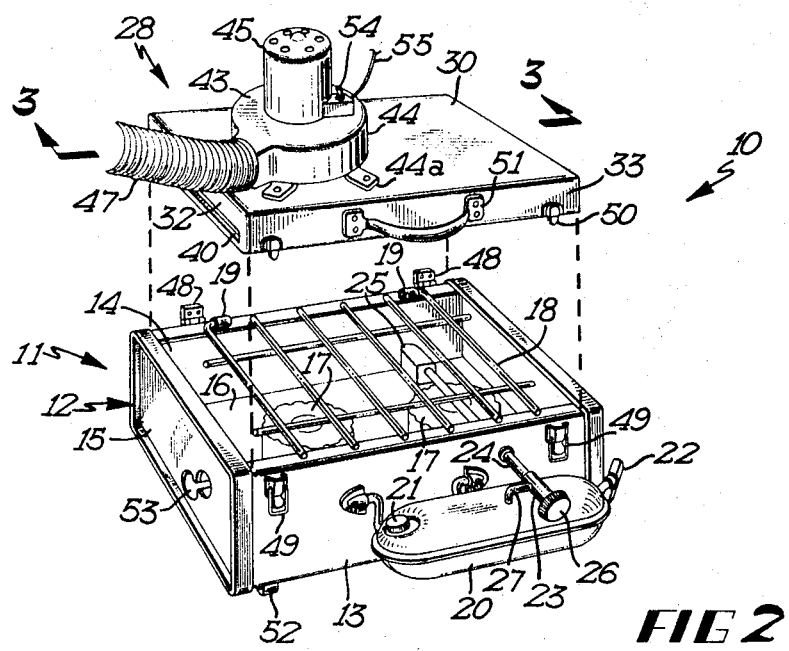
FIG. 2 is an exploded perspective view of the invention.
Figure 3:
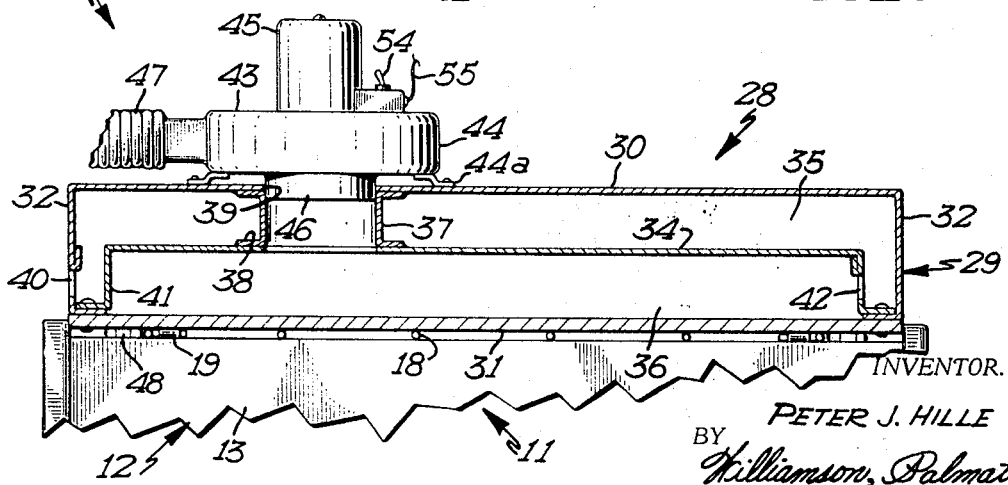
FIG. 3 is a cross-sectional view on an enlarged scale taken approximately along line 3—3 of FIG. 2 and looking in the direction of the arrows.

Referring now to the drawings it will be seen that one embodiment of the novel heating device, designated generally by the reference numeral 10, is thereshown. The heating device 10 is comprised of a heater unit 11. This heater unit 11 may be a conventional camp type stove which is commercially available, such as the Coleman Model Two-Burner Standard Camp Stove. The heater unit is comprised of a housing 12, including a front wall 13, a rear wall 14, end walls 15 and a bottom wall 16. The interior of the housing 12 defines a burner chamber and a pair of burners 17 are positioned therein. It will be noted that the housing is completely open at its upper end and is provided with a grill 18, which is hingedly connected to the rear wall 14 by suitable hinge sleeves 19. Thus the grill 18 is swingable about an axis defined by the hinge sleeve 19 to permit access to the interior of the housing.

The heater unit 11 is provided with a fuel receptacle or tank 20 which is adapted to contain a predetermined amount of liquid fuel therein. The tank 20 has a filler opening closed by suitable filler cap 21 and is also provided with a pump mechanism 22 of conventional construction to permit the unfilled volumetric space of the tank to be charged with air under pressure.

The tank 20 has an outlet opening therein and a valve mechanism 23 is connected to the opening to permit the flow of fuel and air through and into a conduit 24 which is connected in communicating relation to a device 25 for admixing the liquid fuel in proper ratio with air. The fuel-mixing device 25 is also connected by suitable conduits to the burners 17 so that when the valve mechanism 23 is open, fuel will flow to the respective burners.

Valve mechanism 23 is provided with a suitable control knob 26 for controlling movement of the valve element of the valve mechanism so that the conduit 22 may be intercommunicated selectively with the tank 20. A needle valve 27 is also provided to permit very accurate controlling of flow of fuel through the conduit 24. The heating unit 11, heretofore described, does not, per se, constitute the present invention. This heating unit as pointed out above is of conventional construction and is commercially available. In this regard, it is pointed out that the tank 20 may be disconnected from the conduit 24 and may be inserted into the interior of the housing 12 when the unit is not in use. However, the burner unit does form a part of the heating device which constitutes the present invention.

The heating device 10 includes an air heating unit 28 which is comprised of a plenum housing 29. The plenum housing 29 is comprised of an upper wall 30, a lower wall 31, end walls 32 and side walls 33. A horizontally oriented partition 34 is positioned interiorly of the plenum housing 29 and divides the interior thereof into an upper chamber 35 and a lower chamber 36. The partition has an opening therein and an annular member or sleeve 37 having outturned end flanges 38 is rigidly secured to the upper wall 30 and the partition 34 to define a passage interconnecting the lower chamber 36 with the outlet 39 formed in the upperwall 30.

One of the end walls 32 has an elongate slot 40 formed therein which extends throughout substantially the entire length of the end wall to define an inlet opening therein. A wall element 41 is rigidly affixed to the partition 34 and to the lower wall 31 and is spaced inwardly from the end wall 32 in which the opening 40 is formed. Thus the lower chamber 36 is closed with respect to the inlet 40 and a vertical passage is defined which communicates with the upper chamber 35. In the embodiment shown, the partition 34 has one edge thereof spaced inwardly from one of the end walls 32 substantially the width of the partition 34 so that an elongate opening 42 is defined to intercommunicate the chambers 35 and 36 remote from the inlet 40. With this arrangement, it will be seen that air passes through the upper chamber 35 and then passes through the lower chamber 36 before it is discharged through the outlet 39.

The means for causing the air to flow through the housing 28 comprises a blower 43 which is comprised of housing 44 secured to the upper wall 30 of the plenum housing 29 by brackets 44a. The blower 43 has a fan therein which is driven by suitable six volt or twelve volt electric motor 45. The inlet or intake sleeve 46 of the fan is connected in communicating relation to the outlet 39 in the plenum housing 29. The outlet of the fan is detachably connected to one end of an elongate flexible hose or conduit 47 and the other end of the hose is adapted to be positioned into the engine compartment of a conventional aircraft A.

In the embodiment shown, the heater unit housing 12 is hingedly connected to the plenum housing 28 by suitable hinge member 48 which are of well-known construction. The hinge elements 48 are secured to adjacent side walls of the heater unit housing and plenum housing respectively. The heater unit housing 11 is also provided with a pair of latch members 49 while the plenum housing 29 is provided with latch members 50. It will be noted that these latch members 49 and 50 are secured to adjacent side walls of the plenum housing and heater unit housing and actually constitute conventional trunk latches of well-known construction. The plenum housing 29 is also provided with a carrying handle 51 and the heater unit housing may also be provided with a carrier handle if desired. The heater unit housing may also be provided with suitable legs 52, one leg structure located adjacent each end and each being swingable between an operative and inoperative position. It is further pointed out that since the heater unit 11 is provided with two burners, a suitable valve device 53 may be provided to permit one of the burners to be closed and rendered inoperative while the other burner is being used.

In use, an operator will release the latch members 49 from the latch members 50 to allow swinging movement of the air heating unit 28 away from the heater unit housing to permit access to the interior of the latter. The tank 20 will be removed therefrom and will be connected to the fuel mixing device 25 by conduit 24 in a well known manner. The burners may be then ignited, or in the event that only one burner is to be used, the other burner may be shut off. The air heating unit 28 may then be swung to the closed position to rest upon the grill 18. This arrangement permits vertical spacing of the lower wall of the air heating unit above the upper marginal edges of the heater unit housing 12 so that air may readily flow into the heater unit housing. A switch 54 for the electric motor 45 will be closed so that the motor is energized. In this regard, it is pointed out that the electric motor 45 will be connected by suitable electrical conductors 55 to a source of electrical current, such as the electric power system for the aircraft A.

The fan of the blower will be revolved and will cause the air to flow through the inlet 40 and transversely through the upper chamber 35. The air will then flow downwardly through the opening 42 and circulate through the lower chamber 36 of the air heating unit. Thereafter, the air will flow upwardly through the outlet 39 into the fan housing 44, then through the flexible conduit 47, and finally into the engine compartment. By causing the air to circulate through the upper chamber 34 prior to flowing through the lower chamber, it will be seen that the air is first preheated by the warmer air flowing through the lower chamber 36. Thus a highly efficient heat exchange action takes place in the uniquely chambered plenum housing 29.

By sealing the lower chamber 36 from the interior of the heater unit housing, only heated air flows through the air heating unit and into the conduit 47 for heating the aircraft engine. Thus, there is absolutely no danger that any volatile material will be discharged into the aircraft engine compartment. Further, the present heating device permits the use of a liquid fuel, such as gasoline mixtures used in camping stove equipment. Liquid fuel is much easier to handle and utilize in heating devices than commercial gaseous fuels.

Not only will the apparatus very quickly and efficiently heat an engine compartment with a minimum of effort by user, but there is little, if any, danger that the aircraft or user will be injured through the use of the heating device. After the engine compartment is heated sufficiently, the tank 20 may be again placed interiorly of the housing 12, the flexible conduit 24 disconnected from the aircraft and from the heating device and the entire apparatus releasably locked in its inoperative transport condition. When in this condition, the entire heating device is of relatively small compass and may be easily carried from place to place.

From the foregoing description, it will be seen that I have provided a novel aircraft heating device which may be utilized to very quickly and efficiently heat an aircraft engine by an operator with a minimum of effort. Because of its compact construction, the device may be readily carried from place to place and may be used to heat substantially any conventional aircraft engine.

Thus it will be seen that I have provided a novel heating device for aircraft engines which is not only of simple and inexpensive construction, but one which functions in a more efficient manner than any heretofore known comparable device.

It will, of course, be understood that various changes may be made in the form, details, arrangement and proportions of the various parts without departing from the scope of my invention.

What I claim is:

1. A portable heating device for heating aircraft engines comprising
    a heater unit including a housing having an interior and defining a burner chamber, a burner mechanism positioned in said burner chamber,
    a small compact fuel receptacle adapted to contain fuel therein and connected in communicating relation with said burner mechanism,
    a plenum housing positioned upon said heater unit housing and including a lower wall and an intermediate transverse horizontal partition whereby the interior of said plenum housing comprises an upper chamber and a lower chamber intercommunicated with each other adjacent one side of said housing,
    an inlet opening in said plenum housing communicating with said upper chamber, an outlet in said plenum housing communicating with said lower chamber,
    a blower mechanism on said plenum housing having an inlet intercommunicated with the outlet in said plenum housing, said blower mechanism having an outlet,
    an elongate conduit having one end connected with said outlet of the blower mechanism and having the other end thereof adapted for connection with an aircraft engine for heating the same.

2. The heating device as defined in claim 1 and means releasably locking said plenum housing to said heater unit housing.

3. The heating device as defined in claim 1 wherein said plenum housing is of generally rectangular configuration and in addition to said lower wall includes an upper wall, side walls and end walls.

4. The heating device as defined in claim 3 wherein said outlet in said plenum housing extends vertically through the partition in said upper wall, and wherein said blower mechanism is mounted on the upper wall of said plenum housing.

5. The heating device as defined in claim 1 wherein said bottom wall of said plenum housing is of substantially imperforate construction to seal said lower chamber of the plenum housing from the burner chamber of said heater unit.

6. The heating device as defined in claim 3 wherein said inlet opening in said plenum housing comprises an elongate opening corresponding in length to substantially the length of one of said end walls of said plenum housing.

References Cited

UNITED STATES PATENTS

| 1,862,114 | 6/1932 | Gilly | 263—19 |
| 2,295,177 | 9/1942 | King | 263—19 |

FREDERICK L. MATTESON, Jr., *Primary Examiner.*
EDWARD G. FAVORS, *Assistant Examiner.*